UNITED STATES PATENT OFFICE.

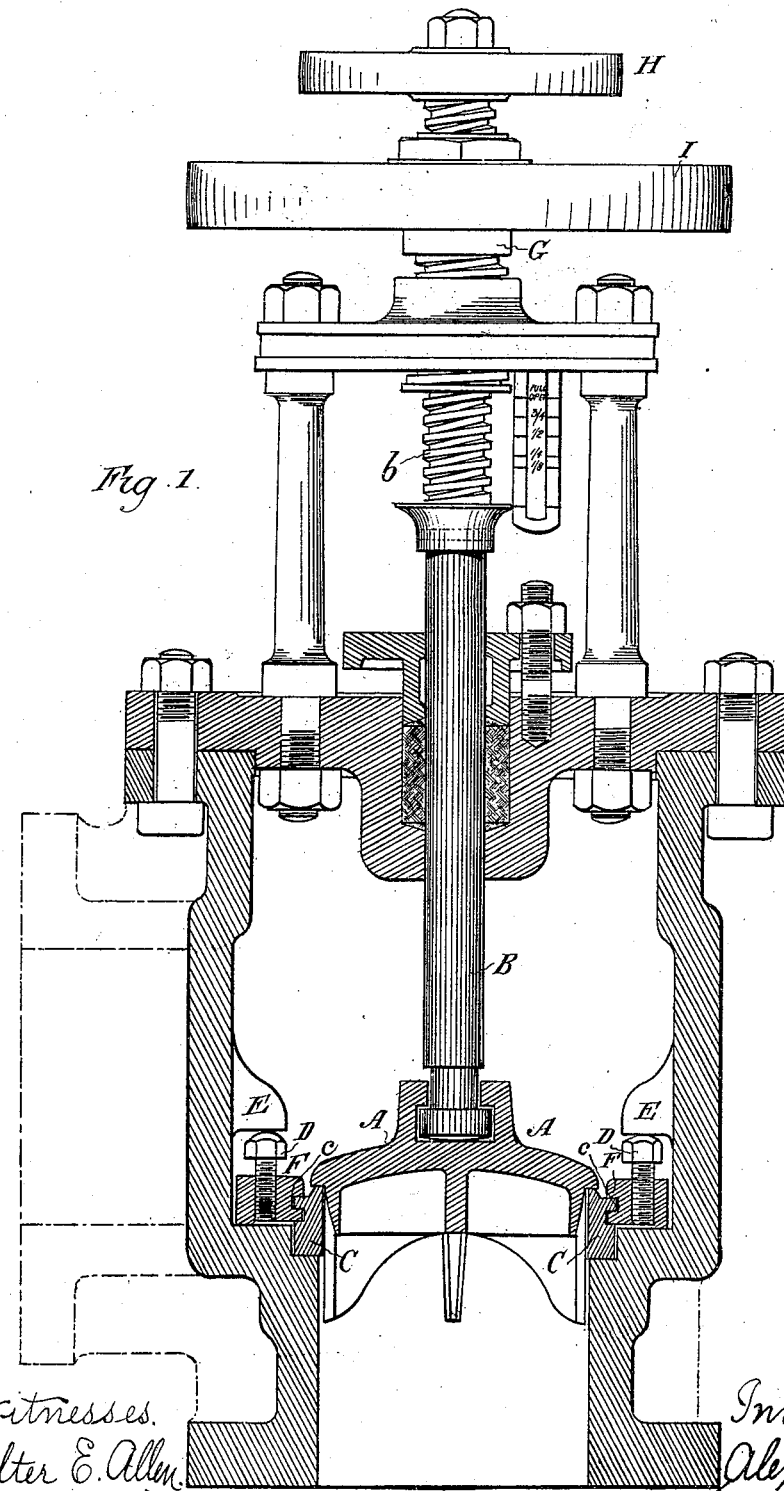

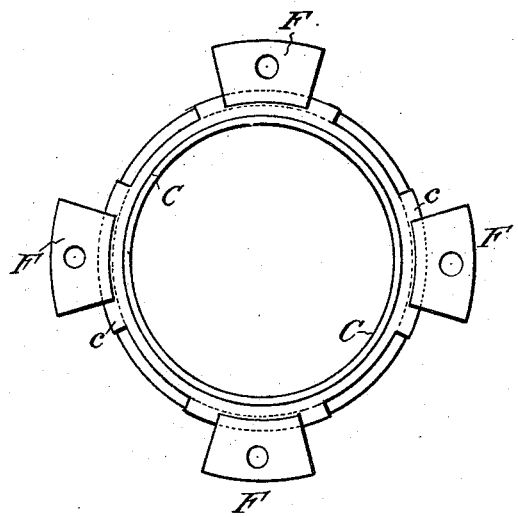

ALEXANDER TURNBULL, OF BISHOPBRIGGS, SCOTLAND.

VALVE.

SPECIFICATION forming part of Letters Patent No. 551,011, dated December 10, 1895.

Application filed April 2, 1894. Serial No. 506,051. (No model.)

*To all whom it may concern:*

Be it known that I, ALEXANDER TURNBULL, engineer, a subject of the Queen of Great Britain and Ireland, residing at St. Mungo Works, Bishopbriggs, Scotland, have invented Improvements in Valves, of which the following is a specification.

This invention relates to improvements in valves, the object of which is, first, to provide improved means for securing in position the liner in which the valve-seat is formed in such a manner that it may be easily removed for renewal and be free to expand, and, second, means for easily shutting the valve completely against high pressure.

In the accompanying drawings, Figure 1 is a vertical section of the valve, and Fig. 2 is a plan of the liner.

A is the valve; B, the stem, which passes through a stuffing-box into the steam-chest. The valve is constructed with a ring formed on the lower surface of the valve, which slopes downward toward the center to allow of a gradual opening of the valve at first.

The liner C, in which the valve-seat is formed, is held down by the bolts D, which are screwed up against lugs E, formed on the sides of the steam-chest. The recesses in the nuts F fit into the ring $c$, formed on the liner, and keep the liner in position. When it is desired to remove the liner, the bolts are slackened or turned in the opposite direction, so that their points may press against the chest and force up the seat or liner, and the nuts are turned around to the openings formed in the ring $c$. The liner can then be removed.

The screw $b$ on the stem works in a nut G, which has a screw-thread formed on its outer surface which differs slightly in pitch from the screw on the stem. The stem terminates in a small handle or wheel H, and the nut G has a large handle or wheel I attached to it. The stem is turned by the small handle or wheel for shutting the valve until it is nearly closed, but just at the end when the pressure is too great to shut the valve with the small handle the nut G is turned, and much greater power is thereby obtained for closing the valve in consequence of the difference in pitch of the two screws.

I claim—

In a valve of the character specified the combination of the passage to be closed, the liner C fitting in said passage and forming a valve seat, and the connections for securing the liner in position consisting of the fixed lugs E, bolts D, nuts F and ring $c$ formed on the liner, substantially as and for the purposes set forth.

In testimony whereof I have signed my name to this specification in the presence of two subscribing witnesses.

ALEX. TURNBULL.

Witnesses:
JOHN SIDDLE,
ARTHUR HARTLEY YUILE.